United States Patent

Hosokawa et al.

Patent Number: 5,290,883
Date of Patent: Mar. 1, 1994

[54] EPOXY RESIN COMPOSITION, CURED PRODUCT OBTAINED THEREFROM, CURING METHOD THEREFOR, AND BONDING METHOD USING THE COMPOSITION

[75] Inventors: Toshitsugu Hosokawa; Takeshi Yamanaka; Hiraku Yamamoto; Koichi Hashimoto; Akihisa Murata; Katsuhito Kamiya, all of Osaka, Japan

[73] Assignee: Nitto Denko Corporation, Osaka, Japan

[21] Appl. No.: 957,392

[22] Filed: Oct. 7, 1992

[30] Foreign Application Priority Data

Mar. 5, 1992 [JP] Japan ................................. 4-84431

[51] Int. Cl.$^5$ ............................................. C08F 283/00
[52] U.S. Cl. ................................... 525/423; 523/435; 523/436; 523/440; 525/396
[58] Field of Search ..................... 523/435, 436, 440; 525/396, 423

[56] References Cited

U.S. PATENT DOCUMENTS

| 495,195 | 9/1990 | Turpin | 156/242 |
|---|---|---|---|
| 4,528,346 | 7/1985 | Sugie et al. | 525/423 |
| 4,623,558 | 11/1986 | Lin | 525/396 |
| 4,822,832 | 4/1989 | Chu et al. | 525/423 |
| 5,002,821 | 3/1991 | Browne et al. | 523/456 |
| 5,026,789 | 6/1991 | Weber et al. | 525/423 |
| 5,087,657 | 2/1992 | Qureshi et al. | 525/396 |

FOREIGN PATENT DOCUMENTS

| 0029008 | 5/1981 | European Pat. Off. . |
| 0392348 | 10/1990 | European Pat. Off. . |
| 0441047 | 8/1991 | European Pat. Off. . |
| 62-185720 | 8/1987 | Japan . |

OTHER PUBLICATIONS

J. App. Polym. Sci., vol. 43, No. 9, Oct. 1991, New York, U.S., pp. 1685–1692, Takao Iijima et al "Modification of epoxy resins with poly(aryl ether ketone)s", Figure 4, p. 1691.

*Primary Examiner*—Robert E. Sellers
*Assistant Examiner*—Randy Gulakowski
*Attorney, Agent, or Firm*—Sughrue, Mion, Zinn, Macpeak & Seas

[57] ABSTRACT

An expoxy resin composition, an epoxy resin cured product obtained therefrom, and a bonding method using the composition are disclosed. The epoxy resin composition comprises an epoxy resin composition comprising (A) 100 parts by weight of an epoxy resin, (B) from 1 to 80 parts by weight of a heat activatable hardener, and (C) from 10 to 100 parts by weight of an aromatic thermoplastic resin powder having a glass transition temperature of 120° C. or more and an average particle diameter of 200 μm or less, said components (A), (B) and (C) being present in a phase separation state.

14 Claims, No Drawings

EPOXY RESIN COMPOSITION, CURED PRODUCT OBTAINED THEREFROM, CURING METHOD THEREFOR, AND BONDING METHOD USING THE COMPOSITION

FIELD OF THE INVENTION

The present invention relates to an epoxy resin composition, a cured product obtained therefrom, a curing method therefor, and a bonding method using the composition. Specifically, the invention relates to an epoxy resin composition suitable for use as an adhesive and which, when used in this purpose, undergoes pre-gelation upon heating for a short period of time to exhibit a function of provisional bonding, and is then cured by further heating to exhibit excellent adhesion properties including bonding strength, high-temperature bonding strength, and water-immersion bonding strength.

BACKGROUND OF THE INVENTION

Epoxy resins have conventionally been widely used as heat-resistant resins. In order to improve a flexibility and impact resistance of epoxy resins, there are attempts to directly modify epoxy resins themselves by various modification techniques such as rubber modification and silicone modification. However, such modification techniques are defective in that although an improvement in flexibility, impact resistance, and the like is achieved, there is a problem that a heat resistance deteriorates.

As an expedient for improving flexibility and impact resistance without deterioration of heat resistance, a technique of blending an epoxy resin with an aromatic thermoplastic resin has been proposed as described in, for example, Journal of the Adhesion Society of Japan (Nippon Setchaku Gakkai Shi), 27 (9), 364 (1991). According to this technique, the two resins are dissolved in a good solvent for both resins to obtain a composition in a solution form and this composition is dried by heating to remove the solvent, thereby obtaining a cured product.

The above technique, however, has a problem that since the composition usually contains a heat activatable hardener, a curing reaction proceeds gradually in the stage of heat-drying for solvent removal and, hence, it is difficult to completely remove the solvent contained in the composition and part of the solvent remains in the final cured product. Further, there is a fear that the composition may have poor storage stability because it should be stored in a solution state. In addition, the proposed technique has still another problem that since the composition is in a solution state in which the epoxy resin and the aromatic thermoplastic resin are in a compatibilized state, the composition, when formulated to have a low solvent content and hence a high solid content, comes to have an exceedingly high viscosity and poor coating operability.

On the other hand, as a heat-curing adhesive which can first undergo pre-gelation for provisional bonding and then be heat-cured, an adhesive comprising an epoxy resin as a base polymer and, added thereto, a poly(vinyl chloride) plastisol is disclosed in, for example, West Germany Offenlegungsschrift No. 2,002,880. Further, adhesives obtained by adding halogen-free thermoplastic resins, such as poly(vinyl butyral), poly(vinyl formal), poly(meth)acrylates, poly(vinyl acetate), polyamides, polyacrylonitrile, cellulose acetate, ethyl cellulose, and nitrocellulose, to epoxy resins are disclosed in JP-A-56-82865, JP-A-62-252491, JP-B-2-48192, and JP-B-2-48193. (The terms "JP-A" and "JP-B" as used herein mean an "unexamined published Japanese patent application" and an "examined Japanese patent publication", respectively.)

When used, for example, for bonding a material to another, these adhesives have an advantage that since the adhesive applied undergoes pre-gelation upon heating for a short period of time and the materials to be bonded are hence brought into a provisionally bonded state, the materials in such a state can be subjected to processings such as bending, cutting, degreasing, and pickling without causing falling or scattering of the adhesive or fouling of the working area or treating liquids by the adhesive.

However, of the above-described adhesives, the adhesive containing poly(vinyl chloride) has a drawback that there are cases that under high-temperature conditions during curing, spot welding, and other operations, a gas is generated due to decomposition of the poly(vinyl chloride) and this gas corrodes steel plates present nearby. The adhesives containing halogen-free thermoplastic resins are defective in that there are cases that bonding strength becomes low as the amount of the thermoplastic resin added increases, or properties such as high-temperature bonding strength and water-immersion bonding strength deteriorate according to the nature of the thermoplastic resin added.

SUMMARY OF THE INVENTION

Under these circumstances, the present inventor have conducted intensive studies to overcome the problems of the above-described conventional epoxy resin compositions containing aromatic thermoplastic resins and to obtain an epoxy resin composition which shows improved flexibility and impact resistance while retaining good heat resistance and has good storage stability and which, when in particular used as an adhesive, first undergoes pre-gelation for provisional bonding and is then heat-cured to show excellent bonding strength, high-temperature bonding strength, and water-immersion bonding strength. As a result, the present invention has been completed.

Accordingly, one object of the present invention is to provide an epoxy resin composition having various excellent properties.

Another object of the present invention is to provide a cured product obtained from the epoxy resin composition.

Further object of the present invention is to provide a curing method of the epoxy resin composition.

Still another object of the present invention is to provide a bonding method using the epoxy resin composition.

The epoxy resin composition according to the present invention comprises (A) 100 parts by weight of an epoxy resin, (B) from 1 to 80 parts by weight of a heat activatable hardener, and (C) from 10 to 100 parts by weight of an aromatic thermoplastic resin powder having a glass transition temperature of 120° C. or more and an average particle diameter of 200 μm or less, those components being present in a phase separation state.

The epoxy resin cured product according to the present invention is obtained by heat-curing the epoxy resin composition under the state that component (A) and component (C) are present in a phase separation state.

The method for curing the epoxy resin composition according to the present invention comprises heating the epoxy resin composition at a temperature which does not cure component (A), thereby compatibilizing components (A) and (C), and then raising the temperature to heat-cure the composition, thereby causing phase separation of component (A) and component (C).

The bonding method according to the present invention comprises provisionally bonding the epoxy resin composition-coated material to an adherend therefor by heating the epoxy resin composition at a temperature higher than a predetermined temperature for a short period of time to dissolve or swell component (C) in component (A), causing pre-gelation, and then further heating the provisionally bonded composition to cure the composition in a state that components (A) and (C) are present in a phase separation state.

DETAILED DESCRIPTION OF THE INVENTION

The epoxy resin used as component (A) in the present invention is not particularly limited. It is, however, preferable to employ a relatively low-molecular epoxy resin having a weight-average molecular weight of from about 200 to 2,000, preferably from about 200 to 1,000, and an epoxy equivalent of from about 100 to 1,000, preferably from about 100 to 500 and containing, on the average, 1.5 or more, preferably 2 or more, epoxy groups per molecule.

The form of the epoxy resin is also not particularly limited, and the resin may be liquid, putty-like, solid, or the like. However, a liquid or putty-like epoxy resin, especially an epoxy resin which is liquid at ordinary temperature, is advantageously used from working efficiency because such an epoxy resin can be easily mixed with other ingredients by a mixing tank or any of various roller mills. When an epoxy resin that is liquid at ordinary temperature is used, it is preferred to employ an epoxy resin having a viscosity of from 5 to 500,000 cP at 25° C. In the case of employing a solid epoxy resin, the resin can be pulverized into a powder and then dry blended with other ingredients, or the resin can be blended with other ingredients by means of a kneader or the like at a low temperature (e.g., about 100° C. or less).

Examples of the epoxy resin used in the present invention include epoxy resins of the bisphenol, hexahydrobisphenol, novolac, dimer acid, poly(ethylene glycol), and glycidyl types. These epoxy resins can be used alone or in combination of two or more thereof. It is possible to freely mix an epoxy resin which is solid at ordinary temperature with one or more epoxy resins which are liquid at ordinary temperature, in such an amount which does not impair the inherent properties of the epoxy resin composition of the present invention and does not cause excess increase of the viscosity, resulting in lowering of workability.

Hardeners for epoxy resins can be used as the heat activatable hardener used as component (B) in the composition of the present invention. Examples thereof include hardeners of the dicyandiamide, imidazole, phenol, acid anhydride, acid hydrazide, fluorinated boron compound, aminimide, and amine types. These hardeners can be used alone or in combination of two or more thereof. The hardener is mixed with the above-described epoxy resin, component (A), in an amount of from 1 to 80 parts by weight, preferably from 3 to 40 parts by weight, per 100 parts by weight of component (A). If the amount of the hardener added is below 1 part by weight, there is a possibility that the epoxy resin does not cure sufficiently. If the hardener is added in an amount exceeding 80 parts by weight, a large amount of unreacted functional groups remain and the curing reaction of the composition may not proceed smoothly.

If use of the above-described component (B) alone is insufficient to cure the epoxy resin, component (A), and this necessitates a lower temperature or a longer period of time for the curing, it is preferred to add a conventionally used curing accelerator in an amount such that storage stability does not deteriorate. Preferred examples of the curing accelerator include curing accelerators of the alkyl-substituted guanidine, (3-substituted phenyl)-1,1-dimethylurea, imidazole, imidazoline, tertiary amine, monoaminopyridine, and aminimide types. It is preferable that such a curing accelerator is added in an amount of 20 parts by weight or less, more preferably from 1 to 10 parts by weight, per 100 parts by weight of the epoxy resin, component (A).

The aromatic thermoplastic resin added as component (C) to the composition of the present invention is in the form of particles having an average particle diameter of 200 μm or less, preferably from 0.1 to 30 μm. Average particle diameter used herein means a value calculated from a particle size distribution curve obtained using a sedimentation-type particle size distribution analyzer. If aromatic thermoplastic resin particles having average particle diameter exceeding 200 μm are used in the composition of the present invention, there are cases that when the composition is heated, components (A) and (C) do not readily solubilize each other, so that the composition becomes ununiform and the rate of pre-gelation is decreased. In some cases, the thermoplastic resin particles dispersed in the composition may sedimentate during storage of the composition, resulting in occurrence of separation phenomenon so that the composition lacks in homogeneity. In the present invention, use of an aliphatic thermoplastic resin, such as poly(methyl methacrylate), poly(vinyl butyral), or poly(vinyl formal), is not preferred because the use thereof results in poor heat resistance of cured products obtained from the composition and also insufficient provisional bonding strength when the composition is used as an adhesive. As long as the aromatic thermoplastic resin powder, component (C), has an average particle diameter in the above-specified range, the powder may be solid or hollow and may be composed of independent primary particles or composed of agglomerates each made up of two or more primary particles.

Further, the aromatic thermoplastic resin used in the present invention has a glass transition temperature (hereinafter referred to as "$T_g$") of 120° C. or more, from the standpoints of the compatibility of the thermoplastic resin with the epoxy resin as component (A) and the property of dissolving completely or partly upon heating, and from the standpoint of maintaining good high-temperature adhesion properties. Use of an aromatic thermoplastic resin having a $T_g$ below 120° C., such as a phenoxy resin, in the composition of the present invention is not preferred in that cured products obtained from the composition have poor heat resistance.

Preferred aromatic thermoplastic resins having a $T_g$ of 120° C. or more are those containing a carbonyl group or a sulfonyl group in the molecule thereof. Examples of such aromatic thermoplastic resins include polysulfones, polyethersulfones, polyarylates, polycarbonates, polyetheretherketones, polyarylsulfones, poly(phenylene oxide)s, polyetherimides, and poly(phenylene sulfide)s. Of these resins, it is preferred to use at least one of polysulfones, polyethersulfones, polyarylates, polycarbonates, polyarylsulfones, and polyetherimides from the standpoints of compatibility with the epoxy resin as component (A), property of pre-gelation, and adhesion properties.

The aromatic thermoplastic resin, component (C), is added to the composition of the present invention in an amount of from 10 to 100 parts by weight, preferably from 15 to 85 parts by weight, per 100 parts by weight of the epoxy resin as component (A). If the amount of component (C) added is below 10 parts by weight, a sufficient improvement in flexibility or impact resistance is not expected and, in addition, there are cases that heating for a short period of time cannot cause the composition to undergo sufficient pre-gelation and to show sufficient provisional bonding properties. On the other hand, the amount of component (C) exceeding 100 parts by weight is not preferred in that the heat curability, bondability, and other functions possessed by the epoxy resin itself are impaired and that the composition comes to have an increased viscosity and, hence, poor coating properties.

The aromatic thermoplastic resin powder described above can be obtained by, for example, the following techniques (1) to (5).

(1) Mechanical pulverization method employing a ball mill, jet mill, or the like.

(2) Spray drying method.

(3) Crystallization method in which the polymer is dissolved in a solvent at a high temperature not lower than the glass transition temperature or melting point of the polymer and the polymer solution is then cooled to precipitate particles of the polymer.

(4) Precipitation method in which a polymer solution obtained by dissolving the polymer in a solvent is mixed with a solvent which is a poor solvent for the polymer but has compatibility with the solvent in the polymer solution, to precipitate particles of the polymer.

(5) Method in which a polymer solution obtained by dissolving the polymer in a solvent is mixed with a solvent which is a poor solvent for the polymer and is not compatible with the solvent in the polymer solution, the resulting mixture is vigorously agitated to obtain an emulsion, and the solvents in the emulsion are then removed to obtain particles of the polymer.

The essential components of the epoxy resin composition of the present invention are as described above. If required and necessary, any other ingredient selected from various kinds of fillers and additives may be suitably added to the composition according to the purpose and use of the composition. Examples of such other ingredients include fillers such as silica, clay, gypsum, calcium carbonate, barium sulfate, quartz powder, glass fiber, kaolin, mica, alumina, alumina hydrate, aluminum hydroxide, talc, dolomite, zircon, titanium compounds, molybdenum compounds, and antimony compounds, pigments, antioxidants, and coupling agents. Where the composition of the present invention is to be used as an adhesive, the composition may be made to have suitability to spot welding or the like by adding thereto a powder of a metal such as copper, zinc, nickel, cadmium, stainless steel, aluminum, or silver, preferably zinc, nickel, stainless steel, or aluminum, thereby to impart electrical conductivity to the composition.

The composition of the present invention can be obtained by mixing the above-described ingredients by means of a roller mill, mixer, Henschel mixer, ball mill, kneader, disper, or the like at ordinary temperature.

In the composition of the present invention, the aromatic thermoplastic resin powder, component (C), is insoluble at ordinary temperature in the liquid epoxy resin, component (A). Under high-temperature conditions, however, the thermoplastic resin begins to completely or partly dissolve in the epoxy resin and, upon cooling to ordinary temperature, the resulting composition becomes prepreg-like or high-viscosity putty-like. Pre-gelation in the present invention means such a change in form of the composition into the high-viscosity state, and the composition in such a state usually is non-tacky and feels dry to the touch.

Curing of the epoxy resin composition of the present invention can be accomplished as follows. First, the composition is heated at a temperature which does not cure component (A), to compatibilize components (A) and (C) each other. Thus, the same effect is brought about as that produced by the conventional method of dissolving the two components using a solvent. The temperature for this first-stage heating is usually from 60° to 130° C., preferably from 80° to 120° C., although it varies depending on the kind and amount of component (C) added. If the heating temperature for this first stage is too high, a curing reaction disadvantageously proceeds simultaneously with the dissolution of components (A) and (C) and, as a result, phase separation occurs before components (A) and (C) have sufficiently dissolved in each other and, hence, the desired effect cannot be produced.

After components (A) and (C) have sufficiently dissolved in each other, the temperature of the resulting composition is further raised. As a result of this heating, a curing reaction takes place and components (A) and (C) gradually separate from each other to form phase separation, thereby obtaining a cured product according to the present invention. In practicing the curing process described above, the temperature of the composition may be raised stepwise, with each of the heating for the compatibilization of components (A) and (C) and the heating for curing being conducted at a constant temperature. Alternatively, however, the curing process for obtaining a cured resin may be carried out in a manner such that the temperature of the composition is raised continuously to bring components (A) and (C) into a dissolved state and then into a phase separation state, so long as components (A) and (C) can be brought into a sufficiently dissolved state before component (A) begins to cure.

The epoxy resin composition of the present invention can be advantageously used in, for example, adhesives, adhesive sheets, coating compositions, reinforcements, potting materials, laminates, and semiconductor sealants. In use for adhesive, the composition is suitable for use, for example, as a structural adhesive for automobiles (spot-welding adhesive) and the like.

The present invention will be explained below in more detail with reference to the following examples, but the invention is not construed as being limited thereto. In these examples, all parts are by weight.

EXAMPLES 1 AND 2

A mixture of 100 parts of a bisphenol A epoxy resin which was liquid at ordinary temperature (epoxy equivalent, about 190; weight-average molecular weight, 380; average epoxy group number per molecule, about 2.0), 5 parts of dicyandiamide (hardener), and 2 parts of 3-(3,4-dichlorophenyl)-1,1-dimethylurea (curing accelerator) was mixed with a polyetherimide powder (average particle diameter, about 15 µm; $T_g$ 217° C.) obtained by Technique (5) described hereinabove by means of a roller mill according to the formulations shown in Table 1. Thus, epoxy resin compositions of the present invention were obtained.

Each of the compositions was heated to 150° C. over a period of 1 hour. As a result, the epoxy resin and the polyetherimide first dissolved uniformly in each other in a temperature range of from 90° to 100° C., and as the temperature of the composition was then raised further, a curing reaction proceeded and the epoxy resin and the polyetherimide gradually separated from each other to form phase separation. Thus, cured products according to the present invention were obtained.

COMPARATIVE EXAMPLES 1 AND 2

The same ingredients as used in Examples 1 and 2, in the same amounts as in each of Examples 1 and 2, were dissolved in methylene chloride in an amount of 5 times the amount of the polyetherimide. The solutions were dried under a reduced pressure at 95° C. for 8 hours and then heated to 150° C. over a period of 1 hour, thereby obtaining cured products.

EXAMPLES 3 AND 4

A mixture of 100 parts of a bisphenol A epoxy resin powder (epoxy equivalent, about 650; weight-average molecular weight, 1,060; average epoxy group number per molecule, about 1.6), 5 parts of dicyandiamide (hardener), and 2 parts of 3-(3,4-dichlorophenyl)-1,1-dimethylurea (curing accelerator) was dry blended with a polysulfone (average particle diameter, about 6 µm; $T_g$ 189° C.) obtained by Technique (5) described hereinabove according to the formulations shown in Table 2. Thus, epoxy resin compositions of the present invention were obtained.

Each of the compositions was heated to 150° C. over a period of 1 hour. As a result, the epoxy resin and the polysulfone first dissolved uniformly in each other in a temperature range of from 100° to 110° C., and as the temperature of the composition was then raised further, a curing reaction proceeded and the epoxy resin and the polysulfone gradually separated from each other to form phase separation. Thus, cured products according to the present invention were obtained.

COMPARATIVE EXAMPLES 3 AND 4

The same ingredients as used in Examples 3 and 4, in the same amounts as in each of Examples 3 and 4, were dissolved in methylene chloride obtained by Technique (5) described hereinabove in an amount of 5 times the amount of the polysulfone. The solutions were dried under a reduced pressure at 95° C. for 8 hours and then heated to 150° C. over a period of 1 hour, thereby obtaining cured products.

EXAMPLE 5

A composition and cured product of the present invention were obtained according to the formulation shown in Table 3 in the same manner as in Example 1 except that a polyarylate (average particle diameter, about 15 µm; $T_g$ 220° C.) obtained by Technique (5) described hereinabove was used in place of the polyetherimide used in Example 1. As in Example 1, the epoxy resin and the polyarylate in the composition heated underwent a dissolved state in a temperature range of from 90° to 100° C. and thereafter became into a phase separation state.

EXAMPLE 6

A composition and cured product of the present invention were obtained according to the formulation shown in Table 3 in the same manner as in Example 1 except that a polyarylsulfone (average particle diameter, about 8 µm; $T_g$ 220° C.) obtained by Technique (5) described hereinabove was used in place of the polyetherimide used in Example 1. As in Example 1, the epoxy resin and the polyarylsulfone in the composition heated underwent a dissolved state in a temperature range of from 110° to 115° C. and thereafter became into a phase separation state.

COMPARATIVE EXAMPLE 5

An epoxy resin composition and cured product were obtained according to the formulation shown in Table 3 in the same manner as in Example 1 except that a phenoxy resin (average particle diameter, about 6 µm; $T_g$ 100° C) obtained by Technique (5) described hereinabove was used as a low $T_g$ aromatic thermoplastic resin in place of the polyetherimide used in Example 1. The epoxy resin and the phenoxy resin in the composition heated underwent a dissolved state in a temperature range of from 80° to 90° C., but both resins did not thereafter become into a phase separation state and remained in the uniformly dissolved state even after cure.

COMPARATIVE EXAMPLE 6

An epoxy resin composition and cured product were obtained according to the formulation shown in Table 3 in the same manner as in Example 1 except that a poly(methyl methacrylate) resin (average particle diameter, about 3 µm; $T_g$ 105° C.) obtained by Technique (5) described hereinabove was used as an aliphatic thermoplastic resin in place of the polyetherimide used in Example 1. The epoxy resin and the poly(methyl methacrylate) resin in the composition heated underwent a dissolved state in a temperature range of from 80° to 85° C., but both resins did not thereafter become into a phase separation state and remained in the uniformly dissolved state even after cure.

EXAMPLES 7 AND 8 AND COMPARATIVE EXAMPLES 7 AND 8

100 Parts of a bisphenol A epoxy resin (epoxy equivalent, about 190; weight-average molecular weight, 380; viscosity, 125 poises (25° C.)) was mixed with 10 parts of dicyandiamide (hardener) and 6 parts of 3-(3,4-dichlorophenyl)-1,1-dimethylurea (curing accelerator) at ordinary temperature for 1 hour using a mixing tank. This mixture was further kneaded by means of a three-roll mill, thereby obtaining an epoxy resin mixture.

On the other hand, a particulate resin composed of spherical fine particles with an average particle diameter of about 6 µm was obtained from a polysulfone ($T_g$ 189° C.) by Technique (5) described hereinabove.

Subsequently, the epoxy resin mixture and the particulate resin were blended according to the formulations shown in Table 4, thereby obtaining epoxy resin-based adhesive compositions.

EXAMPLES 9 AND 10 AND COMPARATIVE EXAMPLE 9

A particulate resin composed of spherical fine particles with an average particle diameter of about 8 μm was obtained in the same manner as in Example 7 except that a polyethersulfone ($T_g$ 225° C.) was used as an aromatic thermoplastic resin. This particulate resin was blended with the same epoxy resin mixture as prepared in Example 7, according to the formulations shown in Table 5. Thus, epoxy resin-based adhesive compositions were obtained.

EXAMPLES 11 AND 12 AND COMPARATIVE EXAMPLE 10

A particulate resin composed of spherical fine particles with an average particle diameter of about 10 μm was obtained in the same manner as in Example 7 except that a non-crystalline polyarylate ($T_g$ 203° C.) was used as an aromatic thermoplastic resin. This particulate resin was blended with the same epoxy resin mixture as prepared in Example 7, according to the formulations shown in Table 6. Thus, epoxy resin-based adhesive compositions were obtained.

EXAMPLES 13 AND 14 AND COMPARATIVE EXAMPLE 11

A particulate resin composed of spherical fine particles with an average particle diameter of about 15 μm was obtained in the same manner as in Example 7 except that a polyetherimide ($T_g$ 217° C.) was used as an aromatic thermoplastic resin. This particulate resin was blended with the same epoxy resin mixture as prepared in Example 7, according to the formulations shown in Table 7. Thus, epoxy resin-based adhesive compositions were obtained.

EXAMPLES 15 AND 16 AND COMPARATIVE EXAMPLE 12

A particulate resin composed of spherical fine particles with an average particle diameter of about 8 μm was obtained in the same manner as in Example 7 except that a polyarylsulfone ($T_g$ 220° C.) was used as an aromatic thermoplastic resin. This particulate resin was blended with the same epoxy resin mixture as prepared in Example 7, according to the formulations shown in Table 8. Thus, epoxy resin-based adhesive compositions were obtained.

EXAMPLES 17 AND 18 AND COMPARATIVE EXAMPLE 13

100 Parts of a bisphenol A epoxy resin (epoxy equivalent, about 190; weight-average molecular weight, 380; viscosity, 125 poises (25° C.)) was mixed with 15 parts of adipic dihydrazide (hardener) at ordinary temperature for 1 hour using a mixing tank. This mixture was further kneaded by means of a three-roll mill, thereby obtaining an epoxy resin mixture.

On the other hand, a particulate resin composed of spherical fine particles with an average particle diameter of about 3 μm was obtained from a polycarbonate ($T_g$ 145° C.) by Technique (5) described hereinabove.

Subsequently, the epoxy resin mixture and the particulate resin were blended according to the formulations shown in Table 9, thereby obtaining epoxy resin-based adhesive compositions.

COMPARATIVE EXAMPLE 14

A particulate resin composed of spherical fine particles with an average particle diameter of about 6 μm was obtained in the same manner as in Example 7 except that a phenoxy resin ($T_g$ 100° C.) was used as an aromatic thermoplastic resin. This particulate resin was blended with the same epoxy resin mixture as prepared in Example 7, according to the formulation shown in Table 10. Thus, an epoxy resin-based adhesive composition was obtained.

COMPARATIVE EXAMPLE 15

A particulate resin composed of spherical fine particles with an average particle diameter of about 3 μm was obtained in the same manner as in Example 7 except that a poly(methyl methacrylate) resin ($T_g$ 105° C.) was used in place of the aromatic thermoplastic resin used in Example 7. This particulate resin was blended with the same epoxy resin mixture as prepared in Example 7, according to the formulation shown in Table 10. Thus, an epoxy resin-based adhesive composition was obtained.

COMPARATIVE EXAMPLE 16

A particulate resin composed of fine particles with an average particle diameter of about 20 μm was obtained in the same manner as in Example 7 except that a poly(vinyl butyral) resin ($T_g$ 80° C.) was used in place of the aromatic thermoplastic resin used in Example 7. This particulate resin was blended with the same epoxy resin mixture as prepared in Example 7, according to the formulation shown in Table 10. Thus, an epoxy resin-based adhesive composition was obtained.

The epoxy resin compositions and cured products obtained in Examples 1 to 18 and Comparative Examples 1 to 16 given above were evaluated for various properties according to the following test methods. The results obtained are shown in Tables 1 to 10.

Viscosity in Solvent-free State

Measurement was made at 20° C. using a B-type viscometer. With respect to the comparative compositions using a solvent, the viscosities thereof were measured after the solvent was removed therefrom under a reduced pressure.

Gelation Time

Each epoxy resin composition was heated on a 150° C. hot plate and the time required for the composition to have no strings was measured.

Pre-gelation Property

Each epoxy resin composition was coated on an iron plate at a thickness of 3 mm. The coating on the plate was allowed to stand for 3 minutes in a hot-air oven regulated to have a temperature of 120° C., and then cooled to room temperature. The cooled coating was evaluated for surface tackiness and peelability from the iron plate according to the following criteria.

○: Dry feeling to the touch and peelable as a sheet.
Δ: Tacky and partly unpeelable.
x: Remaining liquid and unpeelable.

Provisional Bonding Strength

In accordance with JIS-K6850, measurement was made as follows. Each epoxy resin composition was coated on a steel plate (SPCC-SD; 100×25×1.6 mm) over a bonding area of 25×12.5 mm at a thickness of 0.12 mm, and provisional bonding was conducted in a hot-air oven under conditions of 120° C. and 3 minutes, thereby preparing a test piece.

Using a Tensilon tensile tester, the provisional bonding strengths of the thus-prepared test pieces were measured (pulling speed 5 mm/min; measuring temperature 20° C.).

Shear Bonding Strength

In accordance with JIS-K6850, measurement was made as follows. Each epoxy resin composition was coated on a steel plate (SPCC-SD; 100 mm×25 mm×1.6 mm (thickness)) over a bonding area of 25×12.5 mm at a thickness of 0.15 mm. With respect to the compositions of Examples 1 to 6 and Comparative Examples 1 to 6 (Tables 1 to 3), the coated compositions were heat-cured under the conditions described in each of these examples, and the shear bonding strengths of the thus-obtained test pieces were measured with a Tensilon tensile tester (pulling speed 5 mm/min) in atmospheres of 23° C. and 120° C. With respect to the compositions of Examples 7 to 18 and Comparative Examples 7 to 16 (Tables 4 to 10), the coated compositions were heat-cured at 150° C. for 60 minutes, and shear bonding strength measurement was conducted likewise.

High-temperature Bonding Strength

Bonding strength measurement was conducted in the same manner as the measurement of shear bonding strength as described above except that the shear test was performed at temperatures of 80° C., 120° C., and 150° C. The high-temperature bonding strength for each measuring temperature was expressed in terms of retention of bonding strength (%) based on the bonding strength at 20° C.; the retention was calculated using the following equation.

$$\text{Retention (\%)} = \frac{\text{(Bonding strength at each measuring temperature)} \times 100}{\text{(Bonding strength at 20° C.)}}$$

Water-immersion Bonding Strength

Test pieces were prepared in the same manner as in the measurement of shear bonding strength as described above. These test pieces were immersed in 40° C. warm water for 2 weeks, and the shear bonding strengths thereof were then measured. The water-immersion bonding strength was expressed in terms of retention of bonding strength (%) based on the bonding strength before immersion; the retention was calculated using the following equation.

$$\text{Retention (\%)} = \frac{\text{(Bonding strength after immersion in warm water)} \times 100}{\text{(Bonding strength before immersion)}}$$

TABLE 1

| | Example 1 | Example 2 | Comparative Example 1 | Comparative Example 2 |
|---|---|---|---|---|
| Ingredients (parts) | | | | |
| Epoxy resin | 100 | 100 | 100 | 100 |
| Hardener | 5 | 5 | 5 | 5 |
| Curing accelerator | 2 | 2 | 2 | 2 |
| Thermoplastic resin | 20 | 50 | 20 | 50 |
| Methylene chloride | — | — | 100 | 250 |
| Viscosity in Solvent-free State (Poise) | 200 | 1100 | Measurement impossible | Measurement impossible |
| Gelation Time (sec) | 426 | 515 | 256 | 309 |
| Gelation Time (sec) (after 1 week at 40° C.) | 383 | 464 | Measurement impossible due to gelation | Measurement impossible due to gelation |
| Shear Bonding Strength (kg/cm$^2$) | | | | |
| 23° C. | 182 | 167 | 163 | 150 |
| 120° C. | 191 | 182 | 171 | 163 |

TABLE 2

| | Example 3 | Example 4 | Comparative Example 3 | Comparative Example 4 |
|---|---|---|---|---|
| Ingredients (parts) | | | | |
| Epoxy resin | 100 | 100 | 100 | 100 |
| Hardener | 5 | 5 | 5 | 5 |
| Curing accelerator | 2 | 2 | 2 | 2 |
| Thermoplastic resin | 10 | 50 | 10 | 50 |
| Methylene chloride | — | — | 50 | 250 |
| Gelation Time (sec) | 193 | 313 | 116 | 188 |
| Gelation Time (sec) (after 1 week at 40° C.) | 174 | 282 | Measurement impossible due to gelation | Measurement impossible due to gelation |
| Shear Bonding Strength (kg/cm$^2$) | | | | |
| 23° C. | 165 | 113 | 148 | 101 |
| 120° C. | 174 | 124 | 156 | 110 |

TABLE 3

| | Example 5 | Example 6 | Comparative Example 5 | Comparative Example 6 |
|---|---|---|---|---|
| Ingredients (parts) | | | | |
| Epoxy resin | 100 | 100 | 100 | 100 |
| Hardener | 5 | 5 | 5 | 5 |
| Curing accelerator | 2 | 2 | 2 | 2 |
| Thermoplastic resin | 20 | 20 | 20 | 20 |
| Gelation Time (sec) | 1035 | 206 | 212 | 228 |
| Shear Bonding Strength (kg/cm$^2$) | | | | |
| 23° C. | 141 | 170 | 185 | 59 |
| 120° C. | 136 | 180 | 111 | 33 |

TABLE 4

| | Example 7 | Example 8 | Comparative Example 7 | Comparative Example 8 |
|---|---|---|---|---|
| Ingredients (parts) | | | | |
| Epoxy resin | 100 | 100 | 100 | 100 |
| Hardener | 10 | 10 | 10 | 10 |
| Curing accelerator | 6 | 6 | 6 | 6 |
| Thermoplastic resin | 50 | 30 | — | 5 |
| Pre-gelation Property | ○ | ○ | x | Δ |
| Provisional Bonding Strength (kg/cm$^2$) | 14.7 | 4.65 | 0.06 | 0.51 |
| Shear Bonding Strength (kg/cm$^2$) | 145 | 142 | 177 | 188 |
| High-temperature Bonding Strength (%) | | | | |
| 80° C. | 101 | 103 | 90 | 100 |
| 120° C. | 110 | 108 | 93 | 84 |
| 150° C. | 70 | 58 | 20 | 28 |
| Water-immersion Bonding Strength (%) | 89 | 89 | 80 | 81 |

TABLE 5

| | Example 9 | Example 10 | Comparative Example 9 |
|---|---|---|---|
| Ingredients (parts) | | | |
| Epoxy resin | 100 | 100 | 100 |
| Hardener | 10 | 10 | 10 |
| Curing accelerator | 6 | 6 | 6 |
| Thermoplastic resin | 50 | 30 | 5 |
| Pre-gelation Property | ○ | ○ | Δ |
| Provisional Bonding Strength (kg/cm$^2$) | 15.9 | 5.10 | 0.78 |
| Shear Bonding Strength (kg/cm$^2$) | 145 | 150 | 175 |
| High-temperature Bonding Strength (%) | | | |
| 80° C. | 105 | 107 | 101 |
| 120° C. | 115 | 108 | 90 |
| 150° C. | 80 | 61 | 35 |
| Water-immersion Bonding Strength (%) | 95 | 90 | 85 |

TABLE 6

| | Example 11 | Example 12 | Comparative Example 10 |
|---|---|---|---|
| Ingredients (parts) | | | |
| Epoxy resin | 100 | 100 | 100 |
| Hardener | 10 | 10 | 10 |
| Curing accelerator | 6 | 6 | 6 |
| Thermoplastic resin | 50 | 30 | 5 |
| Pre-gelation Property | ○ | ○ | x |
| Provisional Bonding Strength (kg/cm$^2$) | 13.9 | 3.50 | 0.53 |
| Shear Bonding Strength (kg/cm$^2$) | 161 | 172 | 182 |
| High-temperature Bonding Strength (%) | | | |
| 80° C. | 100 | 101 | 106 |
| 120° C. | 95 | 91 | 91 |
| 150° C. | 53 | 32 | 30 |
| Water-immersion Bonding Strength (%) | 85 | 80 | 83 |

TABLE 7

| | Example 13 | Example 14 | Comparative Example 11 |
|---|---|---|---|
| Ingredients (parts) | | | |
| Epoxy resin | 100 | 100 | 100 |
| Hardener | 10 | 10 | 10 |
| Curing accelerator | 6 | 6 | 6 |
| Thermoplastic resin | 50 | 30 | 5 |
| Pre-gelation Property | ○ | ○ | x |
| Provisional Bonding Strength (kg/cm$^2$) | 16.0 | 5.31 | 0.85 |
| Shear Bonding Strength (kg/cm$^2$) | 185 | 190 | 180 |
| High-temperature Bonding Strength (%) | | | |
| 80° C. | 103 | 103 | 98 |
| 120° C. | 109 | 105 | 100 |
| 150° C. | 90 | 72 | 36 |
| Water-immersion Bonding Strength (%) | 85 | 87 | 80 |

TABLE 8

| | Example 15 | Example 16 | Comparative Example 12 |
|---|---|---|---|
| Ingredients (parts) | | | |
| Epoxy resin | 100 | 100 | 100 |
| Hardener | 10 | 10 | 10 |
| Curing accelerator | 6 | 6 | 6 |
| Thermoplastic resin | 50 | 30 | 5 |
| Pre-gelation Property | ○ | ○ | x |
| Provisional Bonding Strength (kg/cm$^2$) | 14.1 | 4.30 | 0.65 |
| Shear Bonding Strength (kg/cm$^2$) | 160 | 168 | 179 |
| High-temperature Bonding Strength (%) | | | |
| 80° C. | 103 | 100 | 102 |
| 120° C. | 111 | 108 | 103 |
| 150° C. | 85 | 70 | 32 |
| Water-immersion Bonding Strength (%) | 90 | 90 | 85 |

TABLE 9

| | Example 17 | Example 18 | Comparative Example 13 |
|---|---|---|---|
| Ingredients (parts) | | | |
| Epoxy resin | 100 | 100 | 100 |
| Hardener | 15 | 15 | 15 |
| Thermoplastic resin | 50 | 30 | — |
| Pre-gelation Property | ○ | ○ | x |
| Provisional Bonding Strength (kg/cm$^2$) | 13.7 | 2.74 | 0.02 |
| Shear Bonding Strength (kg/cm$^2$) | 138 | 150 | 190 |
| High-temperature Bonding Strength (%) | | | |
| 80° C. | 103 | 105 | 101 |
| 120° C. | 70 | 40 | 6 |
| 150° C. | 23 | 15 | 3 |
| Water-immersion Bonding Strength (%) | 75 | 80 | 81 |

TABLE 10

| | Comparative Example 14 | Comparative Example 15 | Comparative Example 16 |
|---|---|---|---|
| Ingredients (parts) | | | |
| Epoxy resin | 100 | 100 | 100 |
| Hardener | 10 | 10 | 10 |
| Curing accelerator | 6 | 6 | 6 |
| Thermoplastic resin | 30 | 30 | 30 |
| Pre-gelation Property | ○ | ○ | ○ |
| Provisional Bonding | 3.06 | 2.00 | 2.01 |

TABLE 10-continued

| | Comparative Example 14 | Comparative Example 15 | Comparative Example 16 |
|---|---|---|---|
| Strength (kg/cm$^2$) Shear Bonding Strength (kg/cm$^2$) | 220 | 119 | 80 |
| High-temperature Bonding Strength (%) | | | |
| 80° C. | 100 | 102 | 51 |
| 120° C. | 60 | 57 | 25 |
| 150° C. | 16 | 8 | 7 |
| Water-immersion Bonding Strength (%) | 64 | 87 | 70 |

As described above, since the epoxy resin composition of the present invention comprises an epoxy resin and, blended therewith, specific amounts of a heat-curing hardener and a specific particulate aromatic thermoplastic resin, the epoxy resin and the aromatic thermoplastic resin dissolve in each other upon heating and, thereafter, separate again from each other to form phase separation state with the progress of curing. Therefore, cured products obtained from the composition can have improved flexibility and impact resistance while retaining good heat resistance. Furthermore, since the composition has an appropriate viscosity even without a solvent, it shows good workability and storage stability. In addition, the composition of the present invention is useful as an adhesive, because it can undergo pre-gelation to show excellent provisional bondability and, after being heat-cured, it exhibits excellent bonding strength, high-temperature bonding strength, and water-immersion bonding strength.

While the invention has been described in detail and with reference to specific embodiments thereof, it will be apparent to one skilled in the art that various changes and modifications can be made therein without departing from the spirit and scope thereof.

What is claimed is:

1. An epoxy resin composition comprising (A) 100 parts by weight of an epoxy resin, (B) from 1 to 80 parts by weight of a heat activatable hardener, and (C) from 10 to 100 parts by weight of an aromatic thermoplastic resin powder having a glass transition temperature of 120° C. or more and an average particle diameter of 200 μm or less which dissolves in said epoxy resin (A) upon heating at a temperature effective to compatibilize epoxy resin (A) and aromatic thermoplastic resin (C) at below the curing temperature of said epoxy resin (A), and said epoxy resin (A) and said aromatic thermoplastic resin (C) being present in a phase separation state after curing said epoxy resin composition, wherein said epoxy resin (A) reverses from a continuous phase before heat-curing to a discontinous phase after heat-curing, and said aromatic thermoplastic resin (C) reverses from a discontinuous phase before heat-curing to a continous phase after heat-curing.

2. An epoxy resin composition as claimed in claim 1, wherein said epoxy resin has a weight-average molecular weight of from about 200 to 2,000.

3. An epoxy resin composition as claimed in claim 1, wherein said epoxy resin has an epoxy equivalent of 100 to 1,000.

4. An epoxy resin composition as claimed in claim 1, wherein said epoxy resin has 1.5 or more epoxy groups, on the average, per molecule.

5. An epoxy resin composition as claimed in claim 1, wherein said epoxy resin is liquid at ordinary temperature.

6. An epoxy resin composition as claimed in claim 5, wherein said liquid epoxy resin has a viscosity of from 5 to 500,000 cP.

7. An epoxy resin composition as claimed in claim 1, wherein an amount of said hardener is from 3 to 40 parts by weight.

8. An epoxy resin composition as claimed in claim 1, wherein said aromatic thermoplastic resin has a carbonyl group or a sulfonyl group in the molecule thereof.

9. An epoxy resin composition as claimed in claim 3, wherein said aromatic thermoplastic resin is at least one member selected from the group consisting of polysulfones, polyethersulfones, polyarylates, polycarbonates, polyarylsulfones, and polyetherimides.

10. An epoxy resin composition as claimed in claim 1, wherein an amount of said aromatic thermoplastic resin is from 15 to 85 parts by weight.

11. An epoxy resin composition as claimed in claim 1, which is an adhesive.

12. An epoxy resin cured product obtained by heat-curing the epoxy resin composition as claimed in claim 1 under the state that components (A) and (C) are present in a phase separation state.

13. A bonding method which comprises provisionally bonding a material coated with the epoxy resin composition as claimed in claim 1 to an adherend therefor by heating the epoxy resin composition at a temperature not lower than a predetermined temperature for a short period of time, to dissolve or swell component (C) in component (A), causing pre-gelation, and then further heating the provisionally bonded composition to cure the composition in a state that components (A) and (C) are present in a phase separation state.

14. A method of curing an epoxy resin composition comprising heating a mixture of (A) 100 parts by weight of an epoxy resin, (B) from 1 to 80 parts by weight of a heat activatable hardener, and (C) from 10 to 100 parts by weight of an aromatic thermoplastic resin powder having a glass transition temperature of 120° C. or more and an average particle diameter of 200 μm or less, at a temperature effective to dissolve said aromatic thermoplastic resin (C) in said epoxy resin (A) at below the curing temperature of said epoxy resin (A), then raising the temperature sufficiently to effect a heat cure of said epoxy resin composition providing a phase separation of said epoxy resin (A) and said aromatic thermoplastic resin (C), wherein said epoxy resin (A) reverses from a continuous phase before heat-curing to a discontinous phase after heat-curing, and said aromatic thermoplastic resin (C) reverses from a discontinuous phase before heat-curing to a continous phase after heat-curing.

* * * * *